United States Patent [19]

Narveson

[11] 4,070,662

[45] Jan. 24, 1978

[54] DIGITAL RASTER DISPLAY GENERATOR FOR MOVING DISPLAYS

[75] Inventor: Parm L. Narveson, Phoenix, Ariz.

[73] Assignee: Sperry Rand Corporation, New York, N.Y.

[21] Appl. No.: 630,833

[22] Filed: Nov. 11, 1975

[51] Int. Cl.[2] .................... G06F 3/14

[52] U.S. Cl. .................... 340/324 AD; 178/30

[58] Field of Search .......... 340/324 AD, 154, 324 A; 178/30

[56] References Cited

U.S. PATENT DOCUMENTS

| | | | |
|---|---|---|---|
| 3,388,391 | 6/1968 | Clark | 340/324 AD |
| 3,396,377 | 8/1968 | Strout | 340/324 AD |
| 3,426,344 | 2/1969 | Clark | 340/324 AD |
| 3,678,497 | 7/1972 | Watson et al. | 178/30 |
| 3,893,100 | 7/1975 | Stein | 178/30 |

*Primary Examiner*—Marshall M. Curtis

*Attorney, Agent, or Firm*—Howard P. Terry; Albert B. Cooper

[57] ABSTRACT

The display generator comprises a map memory having a plurality of addressable locations corresponding respectively to a plurality of incremental display cell areas of the display screen. The apparatus further includes a symbol memory having a plurality of storage matrices for storing the respective plurality of patterns and symbols to be selectively written into the incremental display area cells to thereby form a display picture. The display raster is generated by digital circuits which sequentially address the map memory locations. The map memory words stored in the respective locations each includes a symbol memory address. The digital raster generation circuits are also coupled to the symbol memory for addressing the line of the symbol selected by the map memory for the line by line writing of the selected symbols in the cells of the display.

16 Claims, 4 Drawing Figures

DIGITAL RASTER DISPLAY GENERATOR FOR MOVING DISPLAYS

BACKGROUND OF THE INVENTION

1. Field of the Invention

The invention relates to synthetically generated displays and particularly to cathode ray tube displays utilizing digitally generated rasters.

2. Description of the Prior Art

Digital raster display generators are known in the prior art that utilize permanently wired specially designated circuits for generating the video signals during the time intervals defined by the digital circuitry generating the raster. Such systems generally utilize a unique permanently wired symbol generator for each raster symbol or pattern to be displayed. Such systems have the disadvantages that they are not programmable and that they require large amounts of permanently wired circuitry.

Another prior art digital display generator utilizes a full field refresh memory system where each resolution element of the display is defined by a group of memory bits in accordance with the shades of gray desired for the display. The picture is loaded into the memory from a computer and the entire memory is read out in synchronism with the digital circuitry generating the raster. The serial digital memory output words are converted to analog form and are transmitted to the display for each frame refresh. This prior art display system has the disadvantage that it requires an inordinately large memory for storing the digital words corresponding to all of the resolution elements of the frame. For displays of nominal size utilizing an adequate contrast range, memory capacities of between 500,000 and 1 million bits are required. Additionally, the time required to program the memory renders its use prohibitive with present day technology for rapidly changing display formats. It is also appreciated that because of the necessity for rapid readout of the large memory required, a high speed memory system would of necessity be utilized which system tends to be complex, expensive and critical in operation.

In addition to the above, the desirable ability to superimpose display symbols is generally difficult to achieve in the prior art.

SUMMARY OF THE INVENTION

The present invention obviates the above discussed disadvantages of the prior art systems by providing a digital raster display system having a display face. A raster generator generates a raster on the display face, the raster generator including digital timing circuitry for providing digital signals synchronous with respect to the raster. The apparatus includes a first memory having a plurality of storage locations corresponding to a respective plurality of display cells that comprise the display face, the digital signals addressing the storage location corresponding to the display cell associated with the point of the raster being generated. Each storage location in the first memory contains a symbol address word whereby the first memory provides a symbol address signal corresponding to the symbol address word stored at the storage location addressed by the digital signals. A second memory is included having a plurality of symbol stores for storing a respective plurality of symbols and patterns to be displayed in the display cells comprising the display face. The plurality of symbol stores are addressed by the symbol address signal for providing symbol display signals in accordance with the symbol or pattern stored in the addressed symbol store. The symbol display signals are applied to display means for displaying the symbol or pattern stored in the addressed symbol store in the display cell associated with the point of the raster being generated.

DESCRIPTION OF THE PREFERRED EMBODIMENT

As discussed above, prior art systems utilize hard wired or full field refresh memories defining each resolution element of the display. It has been observed that display formats, particularly those utilized in aircraft display environments, have an inherent amount of uniformity. For example, in an earth-sky display all of the resolution elements in the earth presentation are the same and similarly all of the resolution elements in the sky presentation are the same. In a similar manner, in such aircraft displays, identical alphanumeric symbols as well as repetitive patterns such as checkerboard arrangements are utilized in numerous locations throughout the display format. Thus, in accordance with the invention, it is not necessary to define each picture resolution element on the display but it is sufficient to define a relatively small number of picture element groupings and to position these groupings into the areas of the display where required.

The preferred embodiment of the present invention will be explained in terms of a cathode ray tube (CRT) display but it is appreciated that the invention is applicable to other types of displays as well, such as gas plasma displays, electroluminescent displays and the like.

Figure 1:
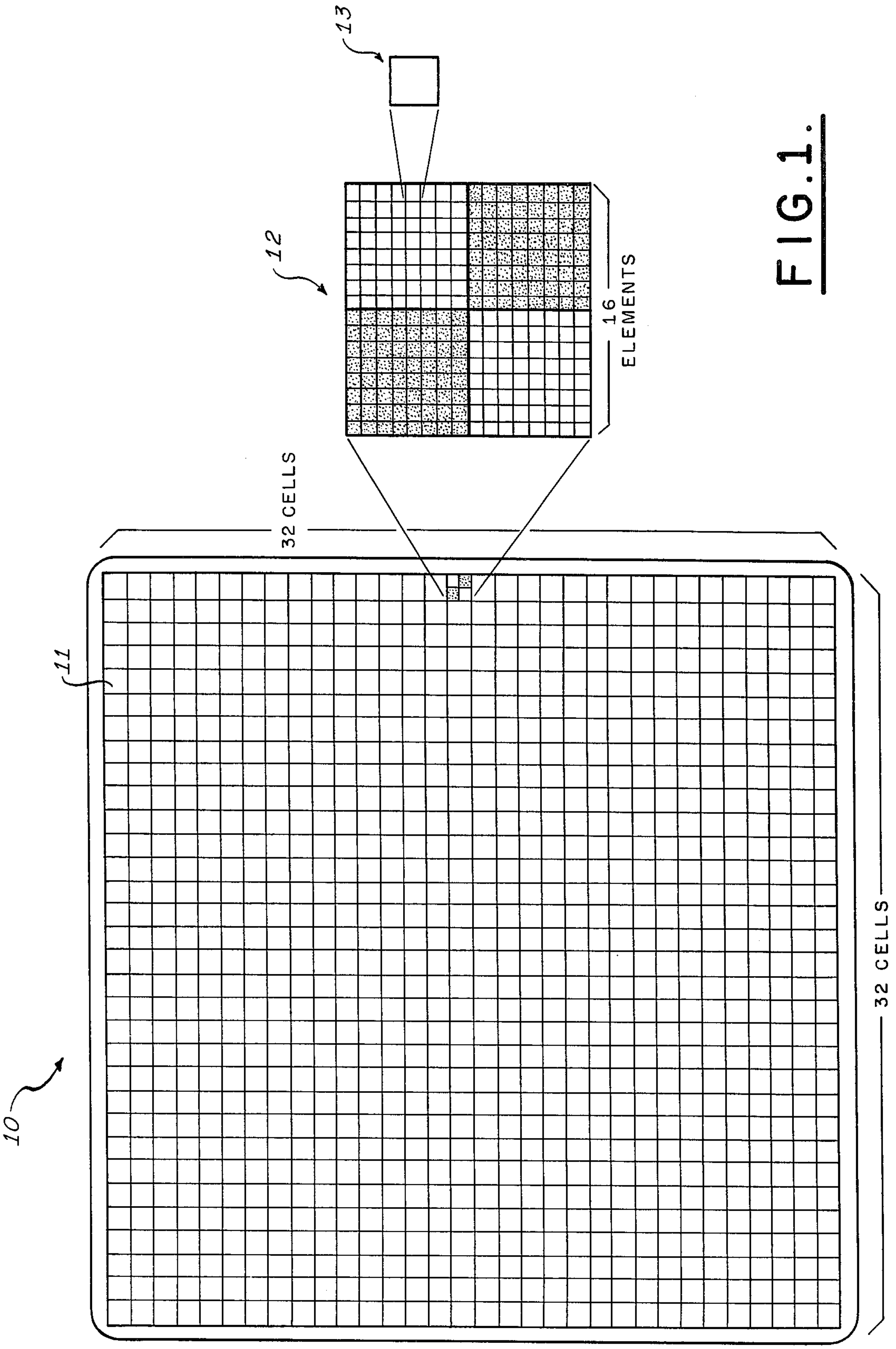
FIG. 1 is a schematic illustration of the display face in accordance with the invention comprising a plurality of display cells.

Referring to FIG. 1, the face of display screen 10 of the system of the present invention is depicted. The display screen 10 is considered divided into a matrix of cells 11 by the horizontal and vertical grid lines illustrated. It will be appreciated that these grid lines are illustrated for purposes of explanation and do not actually appear as part of the display. For purposes of explanation the display screen 10 is shown divided into a $(32 \times 32)$ matrix of cells, other matrix sizes being utilizable in accordance with the specific requirements of a specific application to which the invention is applied. Each of the display cells 11 represents a specific area on the screen and is the smallest area into which a grouping of picture elements can be positioned.

Each of the display cells 11 is further divided into a matrix of picture or resolution elements, each picture element representing the smallest resolvable area of the display screen 10. One such matrix of picture elements is illustrated at 12 as an enlarged representation of one of the display cells 11. An enlarged representation of one of the picture elements of the matrix 12 is illustrated at 13. The matrix 12 of picture or resolution elements is illustrated for the purpose of description as a $(16 \times 16)$ matrix, other matrix sizes being utilizable in practicing the invention. The horizontal and vertical grid lines of the matrix 12 are illustrated for purposes of explanation and do not actually appear on the display screen 10.

Figure 2:
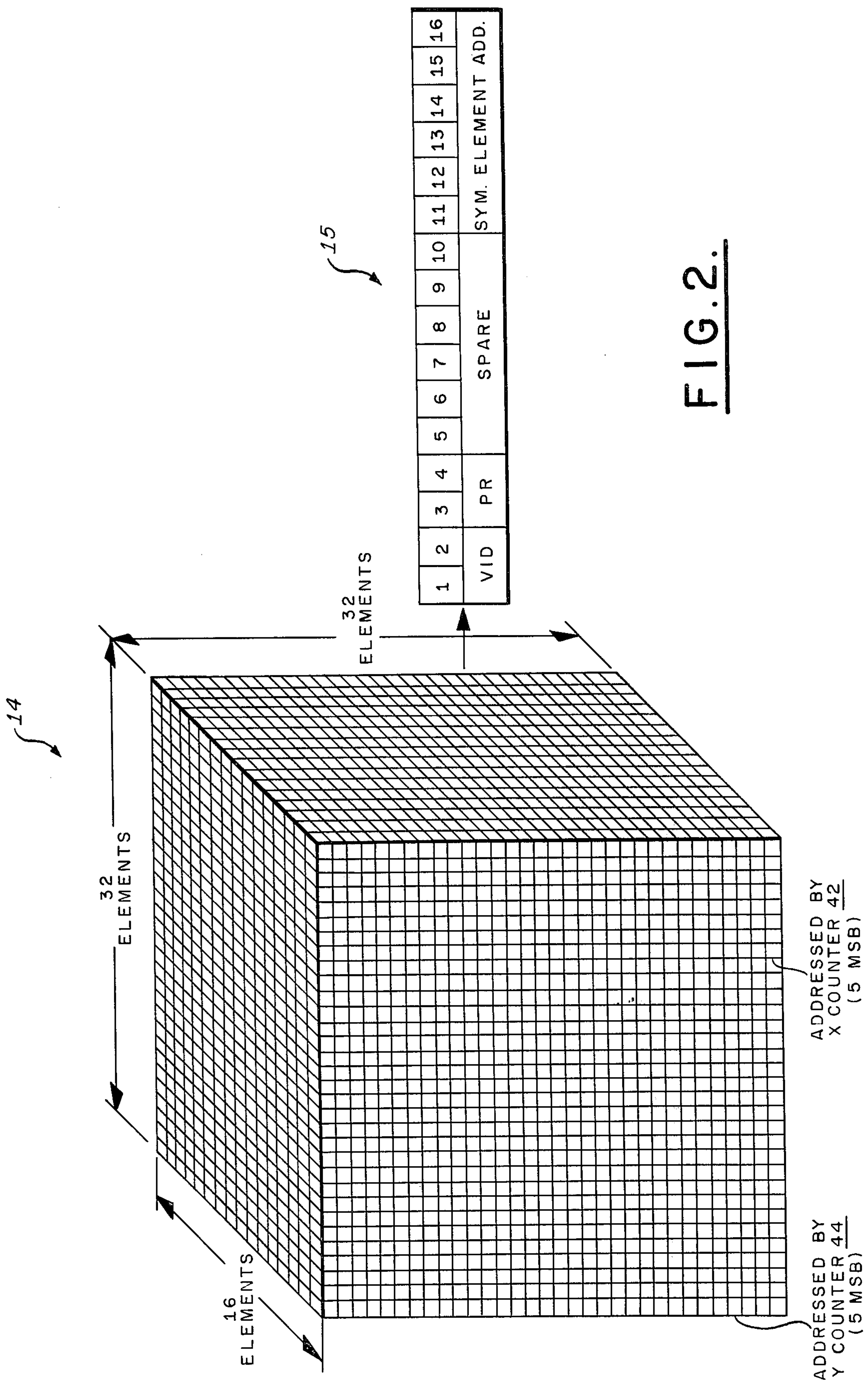
FIG. 2 is a schematic illustration of the map memory utilized in accordance with the invention.

Referring now to FIG. 2, a schematic illustration of map memory 14 is illustrated. The map memory 14 is conveniently instrumented as a random access read-write memory containing 1,024 storage locations for 1,024 16-bit words arranged in a 32 by 32 X-Y configuration. Each of the 16-bit storage locations of the memory 14 is associated with a corresponding display cell of FIG. 1. In a manner to be explained an X-counter and a Y-counter of the timing circuitry that sweeps the beam across the display face 10 (FIG. 1) in raster fashion address the storage locations of the memory 14 so as to provide a real time association between the words of the memory 14 and the cells 11 of the display face 10. Since the cells of the display face 10 form a 32 by 32 matrix as do the words of the memory 14, the five most significant bits of each of the X- and Y-counters provide the addressing signals to the memory 14 in a manner to be further explained.

The word format for each of the 16-bit words stored in the memory 14 is depicted at 15. The first two bits of the word are utilized for the video signal and can thus provide four shades of gray. Bits 3 and 4 of the word are utilized for priority selection in a manner to be explained. The bits 5–10 are not utilized in the present arrangement. Bits 11–16 provide the symbol element address code to be utilized in selecting the symbols and patterns to be displayed in the display cells 11 of FIG. 1 in a manner to be described. The word 15 is thus a symbol defining word having symbol address, video and priority portions. It will be appreciated that the word format may be modified in accordance with the requirements of different embodiments of the invention. For example, if a system were to utilize eight shades of gray, three bits of video would be required. In a similar manner, if additional symbols or patterns are required than those addressable by the bits 11–16, additional symbol element code bits would be utilized.

Figure 3:
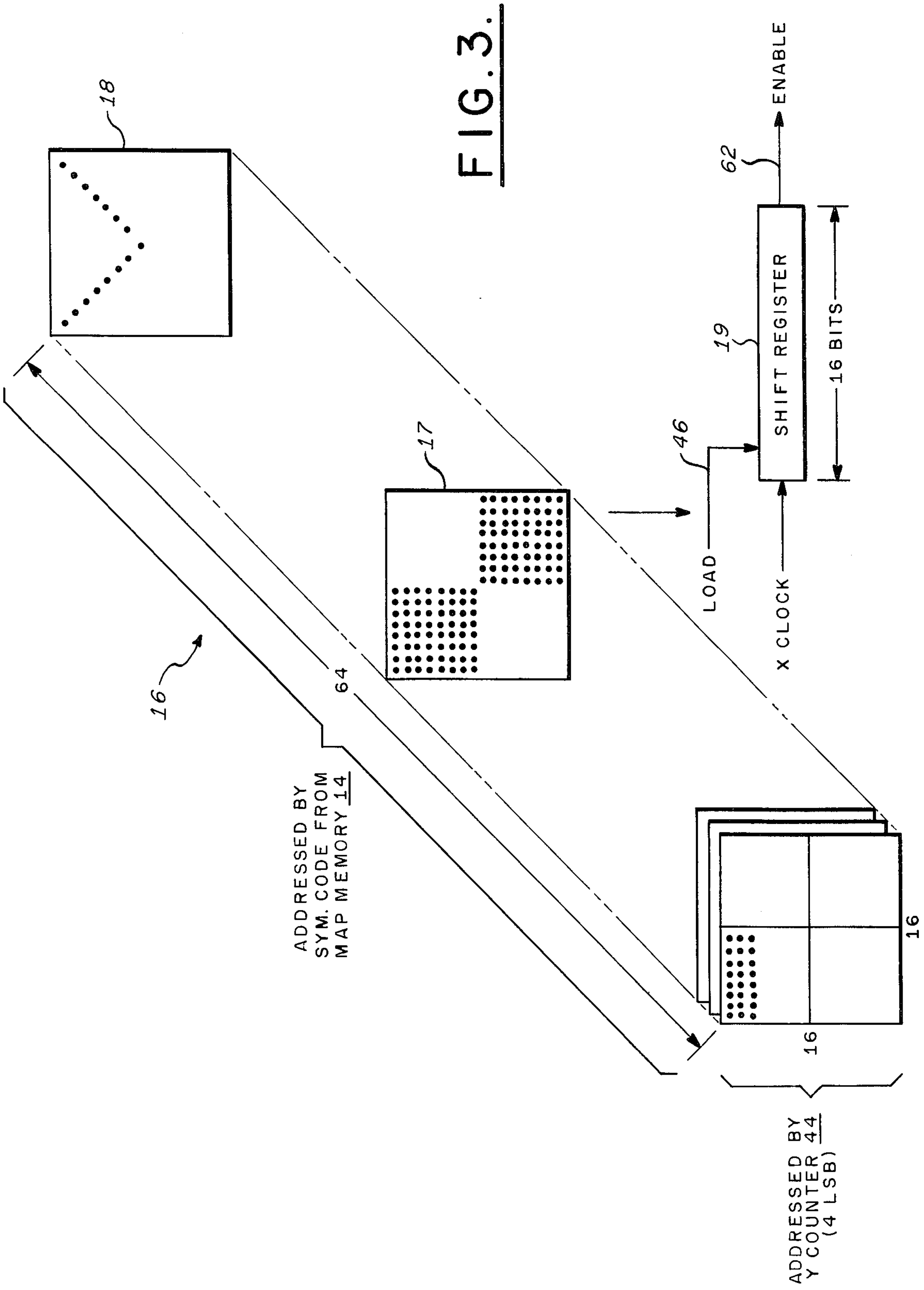
FIG. 3 is a schematic illustration of the symbol memory utilized in accordance with the invention.

Referring now to FIG. 3, a schematic illustration of a symbol memory 16 is depicted. The memory 16 may conveniently be instrumented as a random access memory with read-write capability. The memory 16 is organized into 64 planes or pages, each plane comprising a storage plane for a matrix of 16 by 16 bits. The pattern of bits stored in a plane is configured in accordance with a symbol or pattern to be selectively written into the cells 11 of the display face 10 (FIG. 1). For example, a page 17 of the memory 16 contains the bit configuration for a checkerboard pattern. Similarly, a page 18 of the memory 16 contains a V-shaped pattern. It will be appreciated that each bit of a page in the memory 16 corresponds to a resolution element 13 of the matrix 12 of FIG. 1 in a manner to be clarified.

The symbol element plane or page of the memory 16 is addressed by the symbol element code from the addressed word of the memory 14 of FIG. 2. The row of the addressed symbol is, in turn, addressed by the four least significant bits of the Y counter of the timing circuitry that generates the display raster. As schematically illustrated, the addressed 16-bit row from the addressed memory plane is loaded into a shift register 19 and thereafter shifted out in response to an X-clock to provide the video signals for the display in a manner to be further explained. It will be appreciated that a display picture is composed by writing selected symbols from the memory 16 into display cells 11 on the display face 10 (FIG. 1) under control of the map memory 14 (FIG. 2) in a manner to be discussed.

Figure 4:
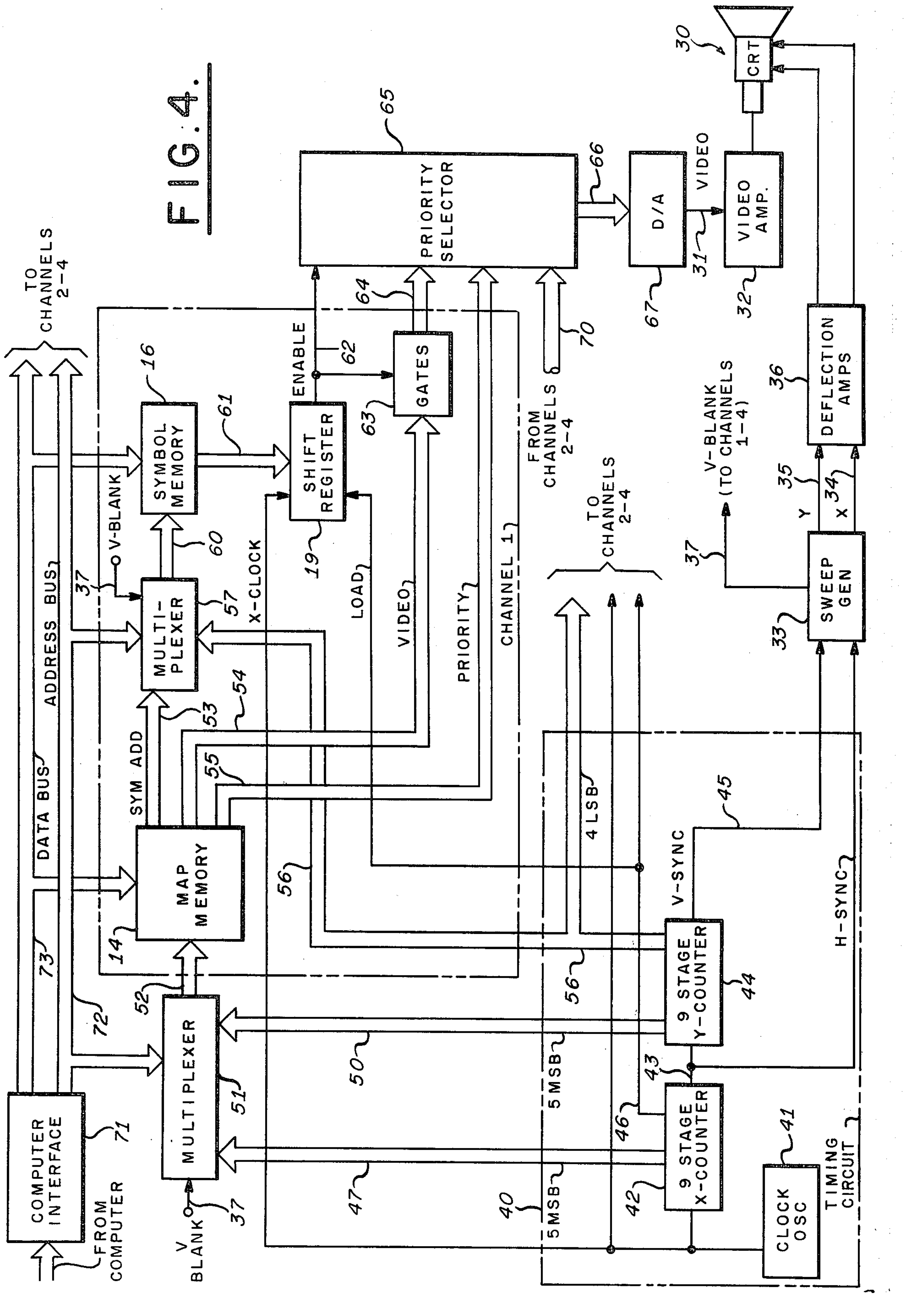
FIG. 4 is a schematic block diagram of the display system implemented in accordance with the invention.

Referring now to FIG. 4, a schematic block diagram of the display system implemented in accordance with the invention is illustrated. The apparatus includes a conventional cathode ray display tube 30, the face 10 of which is illustrated in FIG. 1. The video input to the cathode ray tube 30 is provided on a lead 31 via a conventional video amplifier 32. The X (horizontal) and Y (vertical) sweeps for the raster of the cathode ray tube 30 are provided by a conventional sweep generator 33 via respective leads 34 and 35 and conventional deflection amplifiers 36. The sweep generator 33 may be comprised of the usual sawtooth waveform X and Y sweep generators for providing the conventional linear raster. The sweep generator 33 also provides a vertical blanking pulse on a lead 37 which is generated in a well known manner and coincides with the vertical flyback of the beam of the CRT 30 between frames.

The raster is synchronized by horizontal and vertical sync pulses from a digital timing circuit 40. The timing circuit 40 includes a clock pulse oscillator 41 which provides an X-clock to a 9-stage X-counter 42. Since the counter 42 is comprised of 9 stages, an overflow output is provided on a lead 43 after the counter accumulates 512 X-clock pulses. The counter 42 may be instrumented by any conventional digital counter circuit known in the art. The overflow output 43 from the X-counter 42 provides the horizontal sync pulse to the sweep generator 33. This output signal is also applied as the input to a 9-stage Y-counter 44. The Y-counter 44 may be configured in a manner similar to the X-counter 42 and thus accumulates 512 of the overflow pulses from the X-counter 42 before it in turn provides an overflow signal on a lead 45. The overflow signal from the Y-counter 44 is applied as the vertical sync pulse to the sweep generator 33.

Since the generation of the X and Y raster sweeps from the sweep generator 33 are synchronized via the horizontal and vertical sync pulses from the X and Y counters 42 and 44, the digital outputs from the counters 42 and 44 correspond to the X-Y position of the beam of the cathode ray tube 30. As discussed above with respect to FIG. 1, the face 10 of the display screen is considered divided into a 32 by 32 matrix of cells, each cell comprising a 16 by 16 matrix of resolution elements. Thus, the face 10 of the display screen may be considered as comprised of a 512 by 512 matrix of resolution elements. Since each of the counters 42 and 44 has a capacity of 512 counts, the instantaneous binary numbers in the counters provide the X and Y coordinates of the resolution element of the display screen on which the beam is about to impinge.

The X-counter 42 also provides a "load" signal on a lead 46. The load signal is a pulse that occurs in response to every 16 pulses applied to the counter 42 from the clock pulse oscillator 41. The lead 46 may, for example, be coupled to the fourth least significant stage of the counter 42 in order to provide the required load signal for reasons to be later discussed. It will be appreciated that the load signal occurs just prior to the beam of the cathode ray tube 30 entering a new display cell 11 as the beam is swept across the screen in raster fashion.

The five most significant bits from the X-counter 42 are provided on a cable 47 and the five most significant bits from the Y-counter 44 are provided on a cable 50. It will be appreciated from the above, that as the beam of the cathode ray tube 30 is swept in its raster pattern, the counts in the 5 most significant stages of the counters 42 and 44 remain constant while the beam is within a particular cell 11 and changes count as the beam transitions to the next cell. Thus, each of the cells 11 on the display face 10 has a unique 5-bit binary X and Y address associated there with corresponding to the respective counts of the five most significant stages of the counters 42 and 44. These 5 bit X and Y digital signals on the cables 47 and 50 are applied to a multiplexer 51 which also receives the vertical blanking pulse from the sweep generator 33. For reasons to be later discussed, when the vertical blanking pulse is not present, the X and Y address signals on the cables 47 and 50 are coupled to the map memory 14 via a cable 52. As discussed above with respect to FIG. 2, the five most significant bits from the X-counter 42 and the five most significant bits from the Y-counter 44 provide the address signals for the 1024 16-bit storage locations of the memory 14. In a conventional manner, the memory 14 provides the symbol element address portion of the addressed word on a cable 53, the video portion of the word on a cable 54 and the priority portion of the word on a cable 55. Thus, it is appreciated that when the beam of the cathode ray tube 30 is within a particular display cell of the display face 10, a unique storage location of the memory 14 is addressed and the symbol element address, video and priority portions of the 16-bit word stored therein is provided on the cables 53, 54 and 55, respectively.

The four least significant bits from the four least significant stages of the Y-counter 44 are provided on a cable 56. Since the input to the Y-counter 44 is provided by the overflow signal from the X-counter 42, the counter 44 advances one count as the beam of the cathode ray tube 30 advances vertically by one raster line. Thus the four least significant stages of the counter 44 cycle through a complete count for every 16 raster lines that the beam advances in the vertical direction, consequently providing a unique digital address signal for each raster line in each group of 16 lines. Therefore, with reference to FIG. 1, the four least significant bits on the cable 56 provides a unique address for each row of resolution elements for each matrix 12 of resolution elements within each of the display cells 11 of the display face 10.

The four bit address on the cable 56 is applied to a multiplexer 57 which also receives as inputs the symbol element address on the cable 53 from the map memory 14 as well as the vertical blanking pulse on the lead 37 from the sweep generator 33. For reasons to be explained, when the vertical blanking pulse is absent, the four-bit address on the cable 56 and the symbol element address on the cable 53 are coupled to the symbol memory 16 via a cable 60. As discussed above with respect to FIG. 3, the symbol element code from the map memory 14 addresses a particular plane or page of the symbol memory 16 and the 4 least significant bits from the Y-counter 44 address the particular row of the addressed plane of the memory. By conventional means, the 16-bit word stored in the addressed row of the addressed plane of the memory 16 is applied in parallel to a cable 61. The cable 61 is connected as the parallel loading input of the 16-bit shift register 19 which is coupled to receive the load pulse from the X-counter 42. When the counter 42 generates the load pulse, the 16-bit word on the output cable 61 of the symbol memory 16 is transferred in parallel into the shift register 19. Since, as previously discussed, the load pulse occurs after every 16 pulses from the clock pulse oscillator 41, the load pulse is generated as the beam of the cathode ray tube 30, enters a new display cell 11. Thus, in accordance with the display cell that the beam is entering, a corresponding location in the map memory 14 is addressed by the signals on the cables 47 and 50 which, in turn, addresses the page of the symbol memory 16 containing the symbol to be written into the display cell. The signal on the cable 56 then addresses the row of the symbol to be written and the load signal on the lead 46 transfers the 16 bits of this row into the shift register 19 to control the writing of that row of the selected symbol into the corresponding row of resolution elements that the beam is about to traverse in the display cell at which the beam is located.

The X-clock from the clock pulse oscillator 41 is applied to the shift register 19 as the shifting signal which serially shifts the contents of the register 19 to an enable lead 62 at the raster bit rate. The enable lead 62 is connected to gates 63 which also receive the video bits from the addressed word of the map memory 14. In the particular embodiment described herein, two video bits are provided in parallel to the gates 63 which would comprise two gates, one for each of the two video bits. Both of the gates 63 are controlled by the enable line 62 to transmit the two video bits to a cable 64 when the bit on the line 62 is a ONE and to block transmission of the two video bits from the cable 64 when the bits on the enable line 62 is ZERO. Since the beam of the cathode ray tube 30 traverses the 16 resolution elements in a row of a display cell 11 in synchronism with the X-clock and the X-clock shifts the 16 bits in the corresponding row of the symbol from the shift register 19, the symbol bit emerging from the shift register 19 on the enable line 62 determines whether the video bits on the cable 54 should or should not pass through the gates 63 so as to illuminate the resolution element upon which the beam is impinging in accordance with the value of the video bits if the enabling bit is a ONE or to leave the resolution element dark if the enabling bit is a ZERO, respectively. Thus, it is appreciated that as the beam traverses a row of 16 resolution elements in a display cell, the shade of gray determined by the video bits of the addressed word of the map memory 14 will be selectively applied to the traversed resolution elements in accordance with the bit pattern in the addressed row of the addressed symbol of the symbol memory 16. Since the addressed word of the map memory 14 is controlling over all of the resolution elements in the associated display cell, the same shade of gray is selectively applied to the resolution elements of the cell.

The selectively transmitted video bits on the cable 64, the priority bits on the cable 55 as well as the enable bits from the shift register 19, are applied to a priority selector 65. In a manner to be later described, the priority selector 65 transmits the gated video bits on the cable 64 to a cable 66 in accordance with the priority bits on the cable 55 and the enable bits from the shift register 19. The video bits coupled through the priority selector 65 to the cable 66 are applied to a digital-to-analog converter 67 that in a well known manner converts the binary value of the video bits on the cable 66 to a corresponding analog video signal on the line 31 which, in turn, controls the intensity of the resolution elements of the display face 10 as the beam is swept in raster fashion as described above.

The map memory 14, the multiplexer 57, the symbol memory 16, the shift register 19 and the gates 63, comprise a channel 1 of the system as indicated by the dashed lines. The system further includes three additional channels, each identical to channel 1, where the gated video, priority and enable signals are applied to the priority selector 65 as indicated at 70. The channels 2–4 also receive inputs from the X-clock signal from the oscillator 41, the load pulse from the X-counter 42, the vertical blanking pulse from the sweep generator 33 and the 4-LSB address signal from the Y-counter 44 in the same manner as these signals are applied to channel 1.

The priority selector 65 is comprised of conventional logic circuitry that at each clock time of the system connects the gated video to the cable 66 from that channel having the highest priority and a ONE on the associated enable line. If two or more channels have the same priority, and a ONE on the enable line, the channel with the highest video will be passed to cable 66. Thus the priority selector 65 is utilized to superimpose symbols from the various channels in a manner to be further explained.

The apparatus also includes a conventional computer interface circuit 71 that accepts data from a computer (not shown) to be entered into the map memory 14 and the symbol memory 16 in accordance with the display presentation to be generated on the display face 10 of the cathode ray tube 30. When the vertical blanking pulse is present, the multiplexer 51 accepts address data from an address bus 72 from the computer interface 71 and applies the address data to the map memory 14 via the cable 52. Simultaneously, a data bus 73 from the computer interface 71 applies data to the map memory 14 which is written into the storage locations in accordance with the addresses provided on the address bus 72. In a similar manner, during the presence of the vertical blanking pulse, the multiplexer 57 accepts address data from the address bus 72 and applies the address signals to the symbol memory via the cable 60. The associated data on the data bus 73 is written into the storage locations addressed by the address bus 72. Data is also written into the map and symbol memories of channels 2–4 in the same manner. It will be appreciated that data may be entered into the computer (not shown) by utilizing the apparatus and techniques of U.S. Pat. No. 3,899,662 issued to R. C. Kreeger et al. on Aug. 12, 1975 entitled "Method and Means for Reducing Data Transmission Rate in Synthetically Generated Motion Display Systems" and assigned to the assignee of the present invention.

In operation the apparatus of FIG. 4 may be utilized for providing moving displays of the type that are utilized, for example, in aircraft. During the vertical flyback time of the raster, the vertical blanking pulse applied to the multiplexers 51 and 57 causes the map memory words to be loaded into the map memory 14 from the data bus 73 and the symbol element words to be loaded into the symbol memory 16 from the data bus 73 in accordance with appropriate addresses on the address bus 72 so as to store the map words and symbol element words to define selected portions of the next frame to be displayed. At the end of the vertical blanking pulse the sweep generator 33 begins generating the raster on the display face 10 of the cathode ray tube 30 as synchronized by the timing circuitry 40. As the cathode ray tube beam traverses each of the cells 11 the map memory 14 is addressed by the timing circuitry 40 in the manner described above to provide on its outputs 53–55 the symbol element address, the video and the priority signals in accordance with the addressed word corresponding to the display cell being traversed. The symbol element address on the cable 53 in turn addresses the symbol memory 16 which by means of the shift register 19 and the gates 63 provide the video signals via the priority selector 65 for displaying the addressed symbol in the associated display cell of the display face 10. Thus as the raster is generated, the memories 14 and 16 are synchronously addressed. The selected symbols from the memory 16 are juxtaposed in the display cells 11 of the display face 10 to provide a frame of the display. During the next vertical retrace the contents of the memories 14 and 16 are altered to the extent necessary to provide the next occurring frame. It will be appreciated that programming and updating of the system can be done on a symbol by symbol basis to selectively update the display at a symbol update rate which normally would be slower than the display update refresh rate. Thus if only selected symbols of a presentation are required to exhibit motion, only those symbols need be updated, the symbols that remain stationary not being altered. It will further be appreciated that the apparatus of the present invention may be utilized to present fixed format displays. With this arrangement read only memories may be utilized to implement the map and symbol memories 14 and 16 and the memory updating apparatus 71–73 may be eliminated.

Specifically when the beam of the cathode ray tube 30 first enters a display cell 11 as it is sweeping a horizontal line of the raster, the load signal from the X-counter 42 causes the addressed 16 bit row from the addressed page of the symbol memory 16 to be loaded into the shift register 19. As the beam horizontally scans the 16 resolution elements of the cell in the raster line being scanned, the X-clock synchronously shifts the 16 bits from the register 19 to enable or disable the gates 63 in accordance with the bit being a ONE or a ZERO respectively. Thus the video bits from the map memory 14 either pass through or are blocked by the gates 63 in accordance with the value of the enable bit on the line 62 to either illuminate or not to illuminate the resolution elements with the shade of gray designated by the video bits in accordance with the stored pattern in the symbol memory 16.

As discussed above, channel 1 and three additional identical channels each provide enable, video and priority signals to the priority selector 65. The priority selector 65 is utilized to superimpose up to four symbols stored in the four channels respectively. As described above, the priority selector 65 functions during each X-clock time to select the video of the channel with the highest priority of those channels where the enable bit is a ONE. The selected video is passed to the output cable 66 to provide the video signal on the lead 31. In this manner multiple symbol overlay is achieved since a real time selection down to the picture element level rather than down to the cell level is provided. It will be appreciated that when it is desired that one or more channels not participate in displaying a symbol in a cell, all zeros are stored in the video and priority portion of the associated map memory words for these channels.

In typical aircraft displays, although there are 1,024 display cells on the display face 10 in the present embodiment, generally approximately 250 symbol elements are required at any time. Thus only enough refresh memory (symbol memory 16) to describe these different cells in addition to the circuitry to determine where these cells are positioned on the screen (map memory 14) are required. A four to one savings in memory is obtained by utilizing the technique of the present invention instead of the full field refresh memory technique of the prior art. Not only is the savings in memory accrued by utilizing the present invention, but the inherently high line resolution of the raster is preserved. Additionally, the present invention preserves the advantage of complete programmability of the displays and utilizes a minimum of memory with a relative ease of dynamically updating the system. The present invention may be utilized to generate fixed symbols, movable symbols, programmable bit patterns and vectors. The memory is interrogated at the display refresh rate to refresh the display screen 10.

Thus it is appreciated that the present invention requires only the amount of memory to define those portions of the display screen matrix presently containing symbology, where identical symbols need only be defined once. The invention provides for ease of programmability and permits the use of relatively low speed memories such as provided by the MOS technology.

For clarity of description, the above embodiment of the invention was explained in terms of a simple non-interlaced raster. It will be appreciated that the precepts of the present invention are also applicable to a system having a conventional interlaced raster where the odd raster lines are written in one frame and the even raster lines are written in the next succeeding frame. The apparatus of FIG. 4 may be utilized with an interlaced raster with the following modifications. The line 45 for providing the vertical sync pulse to the sweep generator 33 is coupled to the Y-counter 44 in a conventional manner to provide a vertical sync pulse for every 256 inputs to the Y-counter rather for every 512 inputs thereto. The frequency of the Y-sweep provided on the line 35 is appropriately increased. Additionally, the map memory 14 (FIG. 2) instead of being addressed by the five most significant bits of the Y-counter 44 ($Y_9$, $Y_8$, $Y_7$, $Y_6$, $Y_5$), the memory is now addressed by the five most significant bits less one of the Y-counter 44 ($Y_8$, $Y_7$, $Y_6$, $Y_5$, $Y_4$). With regard to the symbol memory 16 (FIG. 3), instead of being addressed by the four least significant bits of the Y-counter 44 ($Y_4$, $Y_3$, $Y_2$, $Y_1$), the memory is now addressed by the three least significant bits of the Y-counter 44 and the most significant bit thereof ($Y_3$, $Y_2$, $Y_1$, $Y_9$). With the modifications described, the apparatus of FIG. 4 will generate the display in accordance with the symbols stored in the symbol memory 16 as designated by the map memory 14 and with an interlaced raster.

The present invention was described in terms of a display screen 10 having 1,024 display cells with the map memory 14 and the symbol memory 16 having specific sizes commensurate therewith. It will be appreciated that other sizes and configurations may be utilized in practicing the invention in accordance with the system parameters desired. The above described embodiment of the invention was explained in terms of the analog sweep generator 33 synchronized by the horizontal and vertical sync pulses from the digital timing chain 40. It will be appreciated that, alternatively, the binary outputs of the X-counter 42 and the Y-counter 44 may be converted to analog format by conventional digital to analog converters to provide the X and Y raster sweeps with appropriate smoothing filters interposed therebetween.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A digital raster display system having a display face comprising raster generating means for generating a raster on said display face, said raster generating means including digital timing circuit means for providing digital signals synchronous with respect to said raster, first random access programmable memory means responsive to said digital signals and having a plurality of storage locations corresponding to a respective plurality of display cells comprising said display face, said digital signals addressing said storage location corresponding to said display cell associated with the point of said raster being generated, each storage location containing a symbol defining word comprising a symbol address portion, said first memory means providing a symbol address signal corresponding to said symbol address portion of said symbol defining word stored at said storage location addressed by said digital signals, second random access programmable memory means responsive to said symbol address signal and having a plurality of symbol storage means for storing a respective plurality of symbols and patterns to be displayed in said display cells, said plurality of symbol storage means being addressed by said symbol address signal for providing symbol display signals in accordance with said symbol or pattern stored in said addressed symbol storage means, display means responsive to said symbol display signals for displaying said symbol or pattern stored in said addressed symbol storage means in said display cell associated with said point of said raster being generated, and means for periodically updating the data stored in said second random access programmable memory means, whereby motion is readily imparted to said displayed symbol or pattern.

2. The system of claim 1 in which each said storage location of said first memory means contains said symbol defining word comprising said symbol address portion, a video portion and a priority portion, each said symbol storage means of said second memory means comprises a plurality of bit locations for storing bits arranged in accordance with said symbol stored therein, said plurality of bit locations corresponding to a plurality of respective resolution elements comprising each said display cell, said second memory means further includes means for providing said bits in serial fashion and gate means responsive to said bits and to said video portion of said symbol defining word for transmitting said video portion in accordance with the binary state of said bit applied to said gate means, said gate means thereby providing gated digital video signals comprising said symbol display signals, said display means includes digital-to-analog converter means responsive to said gated digital video signals for providing corresponding analog video signals to display said symbol or pattern stored in said addressed symbol storage means in said display cell associated with said point of said raster being generated, said first memory means, said second memory means, said means for providing said bits in serial fashion and said gate means comprised a channel of said system, said system comprising a plurality of said channels, and said system further including priority selector means responsive to said serially provided bits, said gated digital video signals and said priority portion of said symbol defining word of each said channel for transmitting to said digital-to-analog converter means, the gated digital video signals of said channel having the priority portion of largest value and having said serially applied bit in its active state, thereby superimposing on said display face the symbols provided by said respective channels.

3. The system of claim 2 in which said priority selector means further includes means for transmitting to said digital-to-analog converter means the gated digital video signals of said channel having the video portion of largest value of those channels having the priority portion of the same value and having said serially applied bit in said active state.

4. The system of claim 2 in which said raster generating means comprises raster sweep generating means for providing the horizontal and vertical sweep waveforms for generating said raster.

5. The system of claim 4 in which said digital timing circuit means comprises a clock pulse source for providing a clock pulse signal, first digital counting means responsive to said clock pulse signal for providing a first digital count signal in accordance therewith and a horizontal sync pulse at a predetermined count of said first counting means, second counting means responsive to said horizontal sync pulses for providing a second digital count signal in accordance therewith and a vertical sync pulse at a predetermined count of said second counting means, said first and second digital count signals comprising said digital signals, said raster sweep generating means being responsive to said horizontal and vertical sync pulses for synchronizing said horizontal and vertical sweep waveforms.

6. The system of claim 5 in which said second counting means provides a third digital count signal representative of a raster line being generated, said second memory means being responsive to said third digital count signal.

7. The system of claim 6 in which each said symbol storage means of said second memory means comprises a matrix of bit locations for storing bits arranged in accordance with said symbol stored therein, said matrix of bit locations corresponding to a matrix of respective resolution elements comprising each said display cell, the rows of said matrix of bit locations being addressed by said third digital count signal for providing said symbol display signals in accordance with the row of bits stored in said addressed row of said addressed symbol storage means.

8. The system of claim 7 in which said second memory means further includes means for providing said row of bits in serial fashion, said gate means being responsive to said serially provided row of bits and said video portion of said symbol defining word for transmitting said video portion when said bit applied to said gate means is of one binary state and for blocking transmission of said video portion when said bit is of the state opposite said one binary state, said gate means thereby providing said gated digital video signals comprising said symbol display signals.

9. The system of claim 8 in which said means for providing said row of bits in serial fashion comprises shift register means responsive to said clock pulse signal and coupled to receive said row of bits from said addressed row of said addressed symbol storage means for serially shifting said row of bits to said gate means in response to said clock pulse signal.

10. The system of claim 8 in which said display means includes cathode ray tube means, the screen thereof providing said display face, said horizontal and vertical sweep waveforms being applied to said cathode ray tube means to generate said raster on said screen.

11. The system of claim 10 in which said display means includes said digital-to-analog converter means responsive to said gated digital video signals for providing corresponding analog video signals to said cathode ray tube means, thereby displaying said symbol or pattern stored in said addressed symbol storage means in said display cell associated with said point of said raster being generated.

12. The system of claim 11 in which said first memory means, said second memory means, and means for providing said row of bits in serial fashion and said gate means comprise said channel of said system, said system comprising said plurality of said channels.

13. The system of claim 12 including said priority selector means responsive to said serially provided row of bits, said gated digital video signals, and said priority portion of said symbol defining word of each said channel for transmitting to said digital-to-analog converter means, the gated digital video signals of said channel having the priority portion of largest value and having said serially applied bit in said one binary state, thereby superimposing on said display face the symbols provided by said respective channels.

14. The system of claim 6 in which said raster sweep generating means includes means for providing a vertical blanking pulse coincident with the vertical flyback of said raster.

15. The system of claim 14 in which said means for periodically updating comprises means for providing update address signals and update data signals, said first and second memory means being responsive to said update data signals, and first and second multiplexing means responsive to said vertical blanking pulse and said update address signals for providing said update address signals to said first and second memory means in response to said vertical blanking pulse for writing said update signals into said storage locations of said first memory means and into said symbol storage means of said second memory means in accordance with said update address signals, respectively.

16. The system of claim 15 in which said first and second digital count signals are applied to said first multiplexing means for application to said first memory means in the absence of said vertical blanking pulse, and said third digital count signal and said symbol address portion are applied to said second multiplexing means for application to said second memory means in the absence of said vertical blanking pulse.

* * * * *